(12) United States Patent
Hutchison

(10) Patent No.: US 6,405,246 B1
(45) Date of Patent: Jun. 11, 2002

(54) AUTOMATIC AND DYNAMIC SOFTWARE CODE MANAGEMENT

(75) Inventor: Gordon Douglas Hutchison, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/252,321

(22) Filed: Feb. 18, 1999

(30) Foreign Application Priority Data

Sep. 22, 1998 (GB) .............................................. 9820594

(51) Int. Cl.$^7$ ............................................ G06F 15/177
(52) U.S. Cl. ...................... 709/221; 709/217; 709/224; 709/203
(58) Field of Search ................................ 709/221, 310, 709/316, 217, 224, 246, 202; 707/103

(56) References Cited

U.S. PATENT DOCUMENTS

| | | | |
|---|---|---|---|
| 5,423,042 A | | 6/1995 | Jalili et al. .................. 395/700 |
| 5,440,744 A | | 8/1995 | Jacobson et al. ........... 395/650 |
| 5,475,817 A | * | 12/1995 | Waldo et al. ................ 709/316 |
| 5,732,275 A | * | 3/1998 | Kullick et al. ................. 713/1 |
| 5,787,247 A | | 7/1998 | Norin et al. ............. 395/200.5 |
| 5,809,507 A | * | 9/1998 | Cavanaugh, III ........... 707/103 |
| 5,848,419 A | * | 12/1998 | Hapner et al. .............. 707/103 |
| 6,161,147 A | * | 12/2000 | Snyder et al. .............. 709/310 |
| 6,182,107 B1 | * | 1/2001 | Atsatt ......................... 709/100 |
| 6,226,516 B1 | * | 5/2001 | Gupta et al. ........... 379/201.05 |

FOREIGN PATENT DOCUMENTS

| | | |
|---|---|---|
| EP | 0677943 | 10/1995 |
| EP | 0687973 | 12/1995 |

OTHER PUBLICATIONS

"The 3Com/Citrix Thin–Client/Server Remote Access Networking Solution", Sep. 9, 1998, at www.3com.com/technology/tech_net/white_papers/500683.html.
Network Briefing, Mar. 19, 1998, "Internet: ICL Gives Java Away Free, Announces COM2Corba Bridge"—Abstract.
SIGS C++ Report magazine, Sep. 1998, "Object Interconnections", D C Schmidt and S Vinoski.
ORB Portability, Joint Submission (Final), Part 1 of 2, orbos/97–05–15, chapter 3, May 20, 1997.
CORBA/IIOP 2.2 Specification, Feb. 1998, glossary and chapter 9—pp. 1–62.

* cited by examiner

*Primary Examiner*—Mehmet B. Geckil
(74) *Attorney, Agent, or Firm*—Edward H. Duffield

(57) ABSTRACT

A data processing apparatus in communication with a network for allowing the apparatus to communicate with a second data processing apparatus via the network, the data processing apparatus has: a receiving unit for receiving a request on a target object; an activating unit for activating the target object if the target object is inactive; and a dispatching unit for dispatching the request to the target object for execution thereby; wherein the activating unit determines whether software components which it needs to activate the target object are stored locally and if it determines that the software components are not stored locally the activating unit downloads such software components over the network from the second data processing apparatus; and wherein the activating unit selects candidate software components from the locally stored software components based on predetermined criteria and deletes the candidate software components from local storage.

19 Claims, 3 Drawing Sheets

AUTOMATIC AND DYNAMIC SOFTWARE CODE MANAGEMENT

FIELD OF THE INVENTION

The invention relates to the field of client/server (also known as "distributed") computing, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example, of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2", are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic unit 50 of the service required. It may for example do this by sending the first logic unit the name of a remote procedure along with a list of input and output parameters. The first logic unit 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic unit 50 determines which object class in the framework needs to be used, and then creates an instance of that object at the server, a message being sent to that object so as to cause that object to invoke one of its methods. This gives rise to the establishment of the connection with the server computer 20 via the connection unit 80, and the subsequent sending of a request to the second logic unit 90.

The second logic unit 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic unit 90 during the performance of the requested tasks and when results are to be sent back to the first computer 10. The second logic unit 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (ORB) has been defined, which provides the object-oriented bridge between the client and the server machines. The ORB decouples the client and server applications from the object oriented implementation details, performing at least part of the work of the first and second logic unit 50 and 90 as well as the connection unit 80. So, there is usually an ORB software component running on both the client and the server computers so that the client and server can communicate with each other in order to make use of each other's local objects.

It is often desirable to provide so-called "thin"(or lightweight) clients which contain a minimum amount of software functionality so that the client machine can be made easily portable (e.g., a set-top box, personal digital assistant (PDA), laptop computer, or computerized cellular telephone with display screen). However, the thinner the client the less functionality the client is capable of supporting. Thus, it has been difficult to use "thin" clients in situations where the client must be available to serve requests which could involve a wide variety of functionality.

SUMMARY OF THE INVENTION

According to one aspect, the present invention provides a data processing apparatus in communication with a network for allowing the apparatus to communicate with a second data processing apparatus via the network, the data processing apparatus comprising: a receiving unit for receiving a request on a target object; an activating unit for activating the target object if the target object is inactive; and a dispatching unit for dispatching the request to the target object for execution thereby; wherein the activating unit determines whether software components which it needs to activate the target object are stored locally and if it determines that the software components are not stored locally the activating unit downloads such software components over the network from the second data processing apparatus; and wherein the activating unit selects candidate software components from the locally stored software components based on predetermined criteria and deletes the candidate software components from local storage.

According to a second aspect, the present invention provides a method of carrying out the functionality of the first aspect of the invention.

According to a third aspect, the present invention provides a computer program product, stored on a computer readable storage medium, for, when run on a computer, instructing the computer to carry out the functionality of the first aspect of the invention.

Thus, with the present invention, a client machine's working set of software code is allowed to dynamically "grow" and "shrink" depending on demand. This makes a thin client much better able to participate in a distributed computing environment (such as an ORB setting) where the client can be called upon to perform a wide variety of tasks yet still remain "thin" (or lightweight in terms of the amount of active software code in the client's working set). Specifically, if the client is called upon to do a particular task at one point in time, the client makes sure that it has the appropriate software components in its working set by, if necessary, downloading such software components into its working set from a server machine over the network (if the software components are already in the working set, then there is no need for such downloading). At a later point in time, for example, if such downloaded components have not been used for awhile, they can be deleted from the working set to keep the client's working set small. The invention thus enables a thin client to participate fully in a distributed processing environment (such as an ORB setting).

BRIEF DESCRIPTION OF THE DRAWINGS

A preferred embodiment of the present invention will now be described by drawing reference to the following drawing figures.

DETAILED DESCRIPTION OF THE PREFERRED EMBODIMENTS

Figure 1:
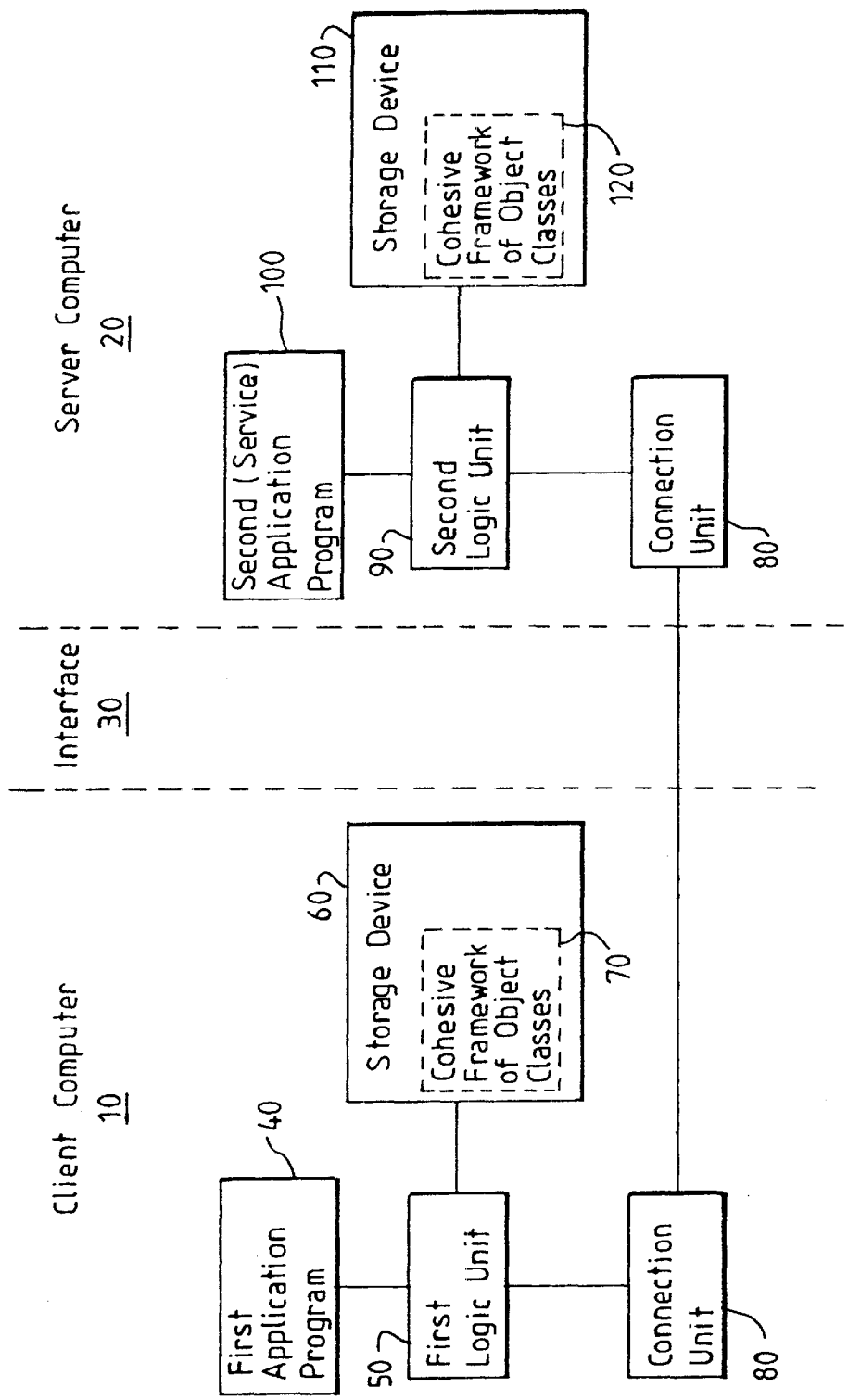
FIG. 1 is a block diagram of a well-known heterogeneous client/server architecture using object technology, in the context of which the present invention can be applied.
Figure 2:
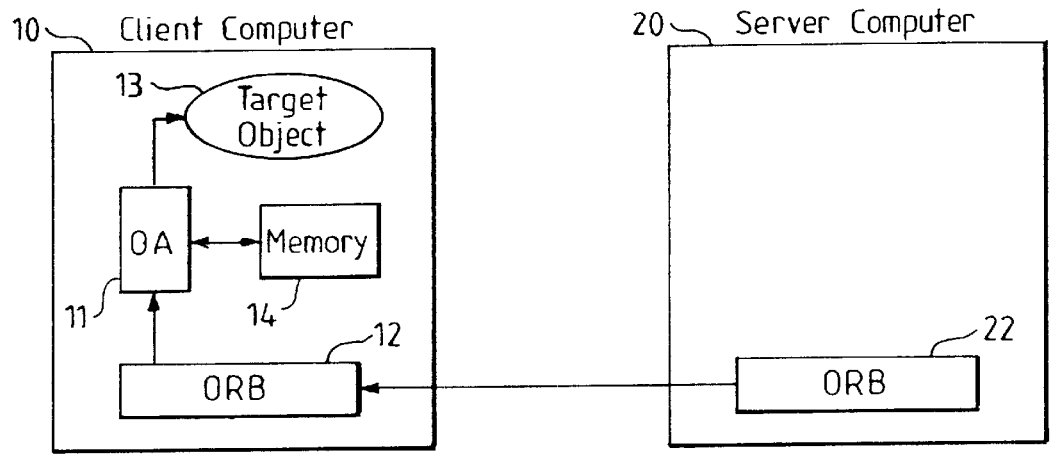
FIG. 2 is another block diagram showing a heterogeneous client/server architecture using object technology, in the context of which the present invention can be applied.

An object adaptor 11 (OA) (see FIG. 2) is a piece of software defined in the OMG's ORB standard. The OA 11 receives requests issued by the server computer 20's ORB 22, such requests being passed over a network from ORB 22 in server computer 20 to ORB 12 in client computer 10. The OA determines how a target object 13 (which has been requested access to) is to be activated in response to the request. The OA 11 links a request to a particular implementation mechanism, prepares the target object, and dispatches (delivers) the request to the target object 13. The early versions of the published OMG standard did not specify much detail about how the OA 11 should be implemented.

The OMG has recently published a new standard (CORBA/IIOP Version 2.2 February 1998) which describes a Portable Object Adaptor (POA), thus giving more detail as to the implementation of an OA. Specifically, the POA described in the OMG standard provides a "servant manager" interface with the ability to activate an object on demand when a POA receives a request on a target object which is inactive. Thus, according to the new POA standard, a request on a target object 13 is held in the OA (i.e., POA) 11 and the OA 11 determines whether the target object 13 is active (ready to serve a request) and if the target object 13 is inactive the POA activates the target object to ready the target object to serve the request. This is all well known and specified in the published OMG POA standard in conjunction with other published OMG standards.

If the client computer 10 is a light-weight (or "thin") client, it is desirable that the working set of active implementation classes maintained in the client be as small as possible (in order to keep the client "thin"). Thus, the object adaptor 11, according to the present invention, is programmed to carry out the following functionality as described by the steps of the flowchart of FIG. 3.

Figure 3:
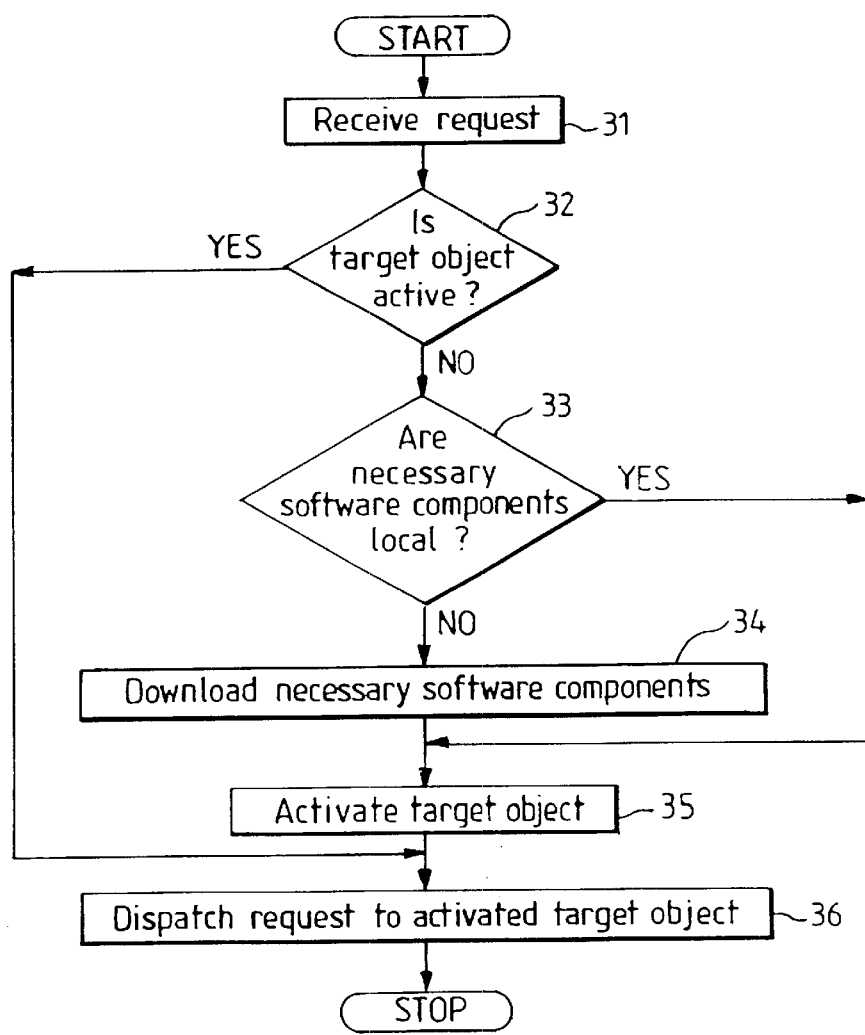
FIG. 3 is a flowchart showing the steps involved when a request is received by a client computer, according to a preferred embodiment of the present invention.

In FIG. 3, at step 31 a request is received by the OA 11, the request being a request for access to a target object 13. At step 32, the OA 11 determines whether the target object is active, that is, whether the implementation class(es) necessary for the target object to carry out the necessary processing to execute the request are loaded and ready. If the YES branch is taken at step 32, control flows to step 36 where the request is dispatched from the OA 11 to the target object 13. If the NO branch is taken at step 32, then control flows to step 33 where it is determined whether the necessary software components (i.e., implementation classes) for the target object to carry out the processing to execute the request are present locally to the client computer 10. That is, it is determined whether such software components stored or maintained locally within the client machine's memory 14. If the YES branch is taken at step 33, control flows to step 35, where the target object 13 is activated.

If the NO branch is taken at step 33, control flows to step 34 where the necessary software components for the target object to carry out the processing to execute the request are downloaded from a server computer (e.g., 20) which stores such software components. After this step is carried out, control flows to step 35 where the target object is activated. Then, control flows to step 36 where, as stated above, the request is dispatched to the activated target object.

Figure 4:
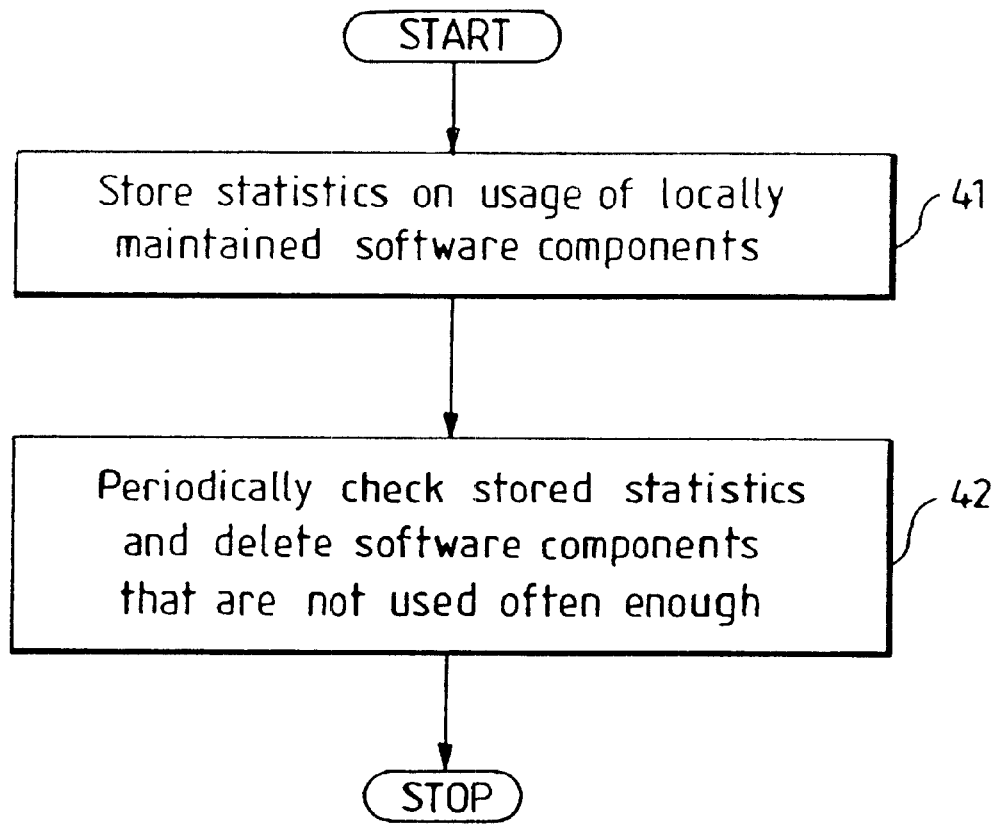
FIG. 4 is a flowchart showing the steps involved when a client periodically removes software components which are not often used, according to a preferred embodiment of the present invention.

The above functionality allows a client computer 10 to be light-weight (thin) because the client does not need to come pre-loaded with many software components, any components which are later found to be necessary can be downloaded from a server. However, over time, the usefulness of such a technique would be limited because the client would soon collect many software components which it may not use very often and thus it is very difficult or impossible for the client to remain "thin" in terms of the amount of software functionality it contains at any one time. Thus, the first embodiment of the invention periodically checks to determine how often software components contained within the client are used with respect to received requests. Only software components which are heavily used are maintained in the client 10. Others are discarded and if they are needed again, they can be downloaded again, on demand, from the server 20. This maintains the client 10 as a "thin" client. FIG. 4 shows the steps involved in implementing this functionality in the preferred embodiment of the present invention.

At step 41, the client 10 stores (in memory 14) statistics on the usage of each of the locally maintained software components in the client's working set of such components. That is, for each software component that is maintained locally (e.g., that is stored in storage 14), statistics are kept of how often each software component is actually used by the client in executing requests. At step 42, the client 10 periodically checks the stored statistical data to determine which software components have not been used very often and deletes those software components from local storage 14. For example, a threshold amount of use could be checked for, such as "has each software component been used at least 10 times since the last periodic check". The frequency of the periodic check is set depending on how often the client is expected to be called upon to execute requests. For a heavily active client, the periodic check is carried out once every minute, but for a client that is not called very often, once a day would be sufficient. The threshold amount of times a software component has been used is also set based on the particular needs of the client involved, such as how "thin" the particular client must be.

In a second embodiment, the check of stored statistics and subsequent deletion is done not on a periodic basis but instead is done during the execution of the flowchart of FIG. 3 (e.g. immediately before the downloading step 34). Thus, adequate storage space for a download is provided immediately prior to the download.

In addition to the amount of use, many other factors can also be taken into account in determining which software components should be deleted. For example, if some software components are part of a group (and all components of the group must be present in the client in order for the client to be able to carry out the function represented by the group) and other components of the group have already been deleted, then the remaining components of the group are likely candidates for next deletion. The size of the files of the locally stored software components can also be taken into account in deciding which components to delete. Further, software components that have travelled a long distance to get to the client machine (e.g. they were previously downloaded from a server in another country) might be less likely candidates for deletion because it may take a while to download them again if they are needed again after deletion.

Thus, emerging ORB standards make possible the dynamic management of a 'working set' of application class implementation code on a user's machine. Class implementations are downloaded and deleted on demand from a user's client machine using a mechanism where this is automatic and transparent to the user.

This is analogous to recent trends in on-line help implementation whereby help text is formatted using html and viewed with a browser. Most help material is delivered with the application CD-ROM. However, when accessing this help some topics actually pull seldom accessed or frequently updated material from the vendor's website with the boundary between the installed help text and the downloaded help text not being obvious to the user. (An example of this is the IBM DB2 UDB V5.0 online help material.) The invention achieves a system whereby something similar can be done transparently for software.

A core set of application classes is installed as a base package. This base contains as a minimum the same top level user interface as a fully featured 'traditional' application with, for example, menu options for features that are currently installed and the menu options for the features not currently downloaded to the client machine. When the features that are not currently installed are accessed from the user interface the mechanism of the preferred embodiment of the present invention comes into play.

The mechanism relies on a novel use of the newly published OMG standard for ORB Portable Object Adapters (POAs) that replaces the previous Object Adapter OMG specification material. The first beta implementations of this POA standard are being delivered currently. As described above, Object adaptors (OA) are passed requests that are brokered by an ORB. The OA determines how an object (request) is activated. It has a means to link a request to a particular implementation mechanism, the means to prepare the receiver (target) object and to deliver the request to it.

The OA is usually shared between many instances and classes of objects. More specific to the target class of the object is a generated skeleton/servant object for that particular class which is responsible for delivering the request in the specific form expected by the objects implementation code. Using current ORB and OA architectures the mechanism of a problem that is encountered is the management of the 'holes' left by the missing class skeletons and implementations which are nonetheless having requests brokered against them. These skeletons could either be 1) missing entirely—in which case the OA would have to deal specifically with missing stubs by downloading them

OR 2) be a form of 'skeleton-skeleton' that first downloaded the real skeleton before forwarding the request In order to keep OAs fairly class neutral, choice 2) is preferable, however, it is preferable to replace the 'skeleton-skeleton' that does the downloading with the downloaded one.

A much more elegant solution is made possible by the new POA specification. The new POA specification introduces a new layer between the object adapter and the skeleton/servant (termed servant in the POA spec). This layer is the 'Servant Manager Interface', these are introduced with: "A servant manager supplies a POA with the ability to activate objects on demand when a POA receives a request targeted at an inactive object". The operations envisaged here are retrieving persistent data and activating the object's instance. However, it is now quite feasible for the servant manager to recognise that the objects implementation CLASS CODE is not present on the local machine and download the necessary class across the network. Subsequently behaving as normal, the operation would not be detectable from the calling object apart from the additional processing time.

A further part of the preferred embodiment of the present invention is to get the Servant Manager to also delete implementation class files that are no longer being used. The algorithms used in other 'paging' type systems can immediately be seen to apply and we have a mechanism for maintaining a dynamic 'working set' of class implementation files that grows and shrinks with use and within the capacity of the client's resources over time.

Thus, provided is a mechanism for the automatic and dynamic management of the installed portion of an object orientated application on a network connected computer system, that application using the facilities of an object request broker. The mechanism preferably involves:

1) Utilisation of the facilities of the ORB intended for the activation for object instances from backing storage as a means for activating the mechanism (the mechanism being shipped as part of the application code) and registering with the ORB using standard architectured means.

2) Providing only a subset of the available application's feature implementation to be installed initially in the computer. This subset having the facility to request of the ORB functions from both the locally available features and requests targeted at object classes not currently downloaded on the computer in the normal manner.

3) The mechanism will be registered as the ORB using the architectured means for the activation of instances of 'persistent' classes within the application and will have available the network server location of all class' implementation code. Furthermore, the mechanism will download missing class implementations across the network when necessary transparently as part of instance activation processing.

4) The mechanism will maintain sufficient data to enable the deletion of the implementation code of the classes of the application it is managing. Furthermore, this facility will be available during the loading of such other classes, or at ORB or application start-up or shut-down as desired.

5) The mechanism will couple a suitable 'paging' type algorithm together with the maintenance of sufficient statistics on the loading/deletion of the classes it is managing with features above to enable a dynamic 'working set' of classes within the application to be maintained. This set being influenced by the pattern of loading requests received, the capacity of the local system or some other configurable mechanism.

The preferred embodiment is based on the new OMG portable object adapter (POA) specification and ORBs which implement it such as the Sun/Javasoft POA orb. Please see OMG document "Orb Portability Joint Submission (Final) orbos/97-05-15" for well known background material on the POA.

An example embodiment of the invention provides an application such as a word processor as a set of user interface classes together with a core set of classes that all users would be expected to use - say open, saving and simple editing of files.

Together with this set of classes an implementation of this mechanism is shipped. It is an object which registers itself with the ORBS POA as a subclass of org.omg.PortableServer.POA (as a 'child POA' to the root POA). This is necessary as the child POA will have the USE_SERVANT_MANAGER policy set on it. Also provided is an instance of the org.omg.PortableServer.ServantManager class that is the servant manager for the child POA. It is this ServantManager which is the preferred embodiment of the present invention.

All object references issued by the application's object factories or any 'flattened' object references shipped with the application will identify the child POA. All requests to objects not already active in the system and thereby not already having an entry in the 'active object map' will use the callback mechanism of the servant manager to identify an appropriate servant for that newly created object. Our servant manager will therefore be given visibility of all initial calls to object instances.

The servant manager, being particular to this application, maintains a table with one row for each class (or downloadable chunk) of the application. Each row would typically have the following elements:

the class(or chunk) name
  eg DocTableColSorter
if the class currently downloaded
  TRUE
the name of the local file
  C:/progs/myapp/classes/DOCTSRT.DLL
  or
  c: /apps/myapp/classes/DocTableCOlSorter.class
the size of the implementation file
  234696 bytes
the number or active requests on object of this class
  5
the date/time when class was last used
  14/05/98-12:01.02.232312
the location of the code server version of the class
  ftp://$(MYAPP_CODE_SERVER)/MYAPP/CDE/US_EN/CLASSES/DOCTSR T.DLL When scheduling requests on objects for the first time the Servant Manager (during the ServantManager::incarnate or preinvoke methods) consults the table and retrieves the required implementation class if required. It then activates the instance of the object and returns the servant in the normal manner. It can be seen that this is analogous to a 'page break' in a virtual memory system and similar algorithms could be applied.

If the client does not have sufficient space within the area allotted for use by this application the ServantManager can use the information in the table to select a class implementation to discard from the local system.

This is a form of 'garbage collection' at the class implementation level. Though it is envisaged that in most applications of this technique the set of downloaded classes will stabilise to fit in with the well trodden paths of the user, it would be possible to use this approach to allow a single user session to make use of more classes than could fit into the client machine at any one time. As the working set evolved each user would download only the classes they used, lightweight users would have small client footprints, power users would have full functionality available locally and users of machines too small to install the whole application could still access all it's features—just not all at the same time.

In summary, the preferred embodiment of the present invention exploits the features of OMG compliant ORBs intended for object instance activation to enable automatic download on demand of class implementation code across the network to a client machine. This is coupled with stored information on such downloaded classes to enable them to be deleted again from the client system. Also store simple statistics on usage of such classes to enable algorithmic management of a 'working set' of implementation classes tailored to the functions that are actually used by the user of that particular client machine thereby providing an object-oriented application with a much smaller 'client footprint'. The mechanism allows client footprints to adapt to how the application is used and to the capacity of the client machine. It is feasible that in very constrained client environments (such as phones, set top boxes etc) the 'working set' of the application can evolve over the course of a single session providing a mechanism akin to automatic code overlays for classes and allowing larger applications to be used in such machines.

What is claimed is:

1. A data processing apparatus in communication with a network for allowing the apparatus to communicate with a second data processing apparatus via the network, the data processing apparatus comprising:

receiving means for receiving a request on a target object;

activating means for activating the target object if the target object is inactive; and dispatching means for dispatching the request to the target object for execution thereby;

wherein the activating means determines whether software components which it needs to activate the target object are stored locally and if it determines that the software components are not stored locally the activating means downloads such software components over the network from the second data processing apparatus; and wherein the activating means selects candidate software components from the locally stored software components based on predetermined criteria and deletes the selected candidate software components from local storage.

2. The apparatus of claim 1 wherein the activating means is software code which conforms to the Object Management Group's Portable Object Adaptor standard.

3. The apparatus of claim 1 wherein the receiving means, activating means and dispatching means are implemented via an object request broker and an associated object adaptor.

4. The apparatus of claim 1 wherein the predetermined criteria includes statistical data concerning the amount of use of the locally stored software components.

5. The apparatus of claim 1 wherein the predetermined criteria includes the size of the locally stored software components.

6. The apparatus of claim 1 wherein the predetermined criteria includes whether the locally stored software components are part of a group of functionally related software components.

7. The apparatus of claim 1 wherein the predetermined criteria includes the geographic origin of the locally stored software components.

8. The apparatus of claim 1 wherein the selection and deletion of candidate software components occurs on a periodic basis.

9. The apparatus of claim 1 wherein the selection and deletion of candidate software components is triggered by the determination that requested software components are not stored locally.

10. A method, in a data processing apparatus in communication with a network for allowing the apparatus to communicate with a second data processing apparatus via the network, the method comprising steps of:

receiving a request on a target object;

activating the target object if the target object is inactive; and dispatching the request to the target object for execution thereby;

wherein the activating step determines whether software components needed to activate the target object are stored locally and if the software components are not stored locally such software components are downloaded over the network from the second data processing apparatus; and wherein the activating step selects candidate software components from the locally stored software components based on predetermined criteria and deletes the selected candidate software components from local storage.

11. The method of claim 10 wherein the activating step uses software code which conforms to the Object Management Group's Portable Object Adaptor standard.

12. The method of claim 10 wherein the receiving means, activating means and dispatching means are implemented via an object request broker and an associated object adaptor.

13. The method of claim 10 wherein the predetermined criteria includes statistical data concerning the amount of use of the locally stored software components.

14. The method of claim 10 wherein the predetermined criteria includes the size of the locally stored software components.

15. The method of claim 10 wherein the predetermined criteria includes whether the locally stored software components are part of a group of functionally related software components.

16. The method of claim 10 wherein the predetermined criteria includes the geographic origin of the locally stored software components.

17. The method of claim 10 wherein the selection and deletion of candidate software components occurs on a periodic basis.

18. The method of claim 10 wherein the selection and deletion of candidate software components is triggered by the determination that requested software components are not stored locally.

19. A computer program product stored on a readable storage medium for, when run on a data processing apparatus, instructing the data processing apparatus to carry out a method, in the data processing apparatus which is in communication with a network for allowing the apparatus to communicate with a second data processing apparatus via the network, the method comprising steps of:

receiving a request on a target object;

activating the target object if the target object is inactive; and dispatching the request to the target object for execution thereby;

wherein the activating step determines whether software components needed to activate the target object are stored locally and if the software components are not stored locally such software components are downloaded over the network from the second data processing apparatus; and wherein the activating step selects candidate software components from the locally stored software components based on predetermined criteria and deletes the selected candidate software components from local storage.

* * * * *